(12) United States Patent
Wu (10) Patent No.: US 10,801,655 B2
(45) Date of Patent: Oct. 13, 2020

(54) QUICK COUPLER ASSEMBLY

(71) Applicant: Ping-Hung Wu, Tainan (TW)

(72) Inventor: Ping-Hung Wu, Tainan (TW)

( * ) Notice: Subject to any disclaimer, the term of this patent is extended or adjusted under 35 U.S.C. 154(b) by 0 days.

(21) Appl. No.: 16/354,314

(22) Filed: Mar. 15, 2019

(65) Prior Publication Data

US 2019/0285218 A1 Sep. 19, 2019

(30) Foreign Application Priority Data

Mar. 16, 2018 (TW) .............................. 107203425 U (51) Int. Cl.
*F16L 37/44* (2006.01)
*F16L 37/46* (2006.01)
*F16L 37/23* (2006.01)
*F16L 37/107* (2006.01)

(52) U.S. Cl.
CPC ............. *F16L 37/44* (2013.01); *F16L 37/107* (2013.01); *F16L 37/23* (2013.01); *F16L 37/46* (2013.01)

(58) Field of Classification Search
CPC . F16L 37/44; F16L 37/46; F16L 37/42; F16L 37/107; F16L 37/23; F16L 2201/20
See application file for complete search history.

(56) References Cited

U.S. PATENT DOCUMENTS

| | | | | |
|---|---|---|---|---|
| 2,297,548 A * | 9/1942 | Fox | ........................ | F16L 37/22 285/277 |
| 2,344,739 A * | 3/1944 | Shaff | ..................... | F16L 37/248 251/149.5 |
| 2,919,935 A * | 1/1960 | Nyberg | .................... | F16L 37/23 251/149.6 |
| 3,140,072 A * | 7/1964 | Scinto, Jr. | ............... | F16L 37/23 251/89.5 |
| 3,567,175 A * | 3/1971 | Sciuto, Jr. | ............... | F16L 37/23 251/149.6 |
| 4,546,956 A * | 10/1985 | Moberg | ................... | F16L 37/46 251/149 |
| 5,451,031 A * | 9/1995 | Purvis | ..................... | F16L 37/46 251/100 |
| 6,279,874 B1 * | 8/2001 | Nyberg | ................. | F16L 37/121 137/614.03 |
| 7,926,783 B1 * | 4/2011 | Liu | ......................... | F16L 37/44 251/149.6 |
| 9,528,649 B2 * | 12/2016 | Aoki | ........................ | F16L 37/44 |
| 10,247,341 B2 * | 4/2019 | Liu | .......................... | F16L 37/23 |

* cited by examiner

*Primary Examiner* — David Colon-Morales
(74) *Attorney, Agent, or Firm* — Muncy, Geissler, Olds & Lowe, P.C.

(57) ABSTRACT

A quick coupler assembly includes inlet and outer valve parts axially spaced inside a housing unit. The inlet valve part has an inlet chamber. A quick release locking sleeve is sleeved on the housing unit to control locking elements for engaging/disengaging a pipe connector inserted into the outlet valve part. An inner slide sleeve sleeves around the inlet valve part in the housing unit and has a control chamber around the inlet valve part to communicate the inlet chamber through radial passage holes. An outer operating sleeve extends around the housing unit to move the inner slide sleeve relative to the inlet valve part, and is able to abut and immobilize the quick release locking sleeve during passage of fluid.

11 Claims, 6 Drawing Sheets

QUICK COUPLER ASSEMBLY

CROSS-REFERENCE TO RELATED APPLICATION

This application claims priority to Taiwanese Patent Application No. 107203425, filed on Mar. 16, 2018.

FIELD

The disclosure relates to a coupler assembly, and more particularly to a quick coupler assembly for coupling a pipe to a fluid supply source.

BACKGROUND

A conventional quick coupler assembly used in a pipeline is generally installed on a fluid supply device for supplying fluid, such as liquid or gas. Because the conventional quick coupler assembly is capable of being attached to or detached from a pipe without using a tool and is able to open or close a fluid flow path, it has been widely used.

However, the conventional quick coupler assembly is unsafe because it can be detached and disassembled from the pipe during a non-fluid blocking state where fluid flows through the conventional quick coupler assembly. Because of lack of safe mechanism, if the pipe is carelessly disassembled or accidentally escapes from the conventional quick coupler assembly during the non-fluid blocking state, high pressure fluid inside the assembly can spurt out from the pipe and even blow away pipe component parts. Thus, there is a need of avoiding such potential dangers.

SUMMARY

Therefore, an object of the disclosure is to provide a quick coupler assembly of the above-mentioned type that can alleviate at least one drawback of the prior art.

According to the disclosure, a quick coupler assembly mountable on a fluid supply device for assembly with a pipe connector includes a housing unit, an inlet valve part, an outlet mechanism and a control mechanism.

The housing unit defines an axis and includes an inlet housing part to be connected to the fluid supply device, an outlet housing part axially spaced apart from the inlet housing part, an intermediate housing part connected between the inlet housing part and the outlet housing part, and a receiving space cooperatively defined by the inlet, outlet and intermediate housing parts. The intermediate housing part has at least one through hole.

The inlet valve part is installed inside the receiving space, and has a tubular valve wall surrounding an inlet chamber that has an inlet open end for access of fluid, and at least one passage hole radially formed in the tubular valve wall and communicating with the inlet chamber.

The outlet mechanism includes an outlet valve part installed inside the receiving space, a quick release locking sleeve movably sleeved on the housing unit, and at least one locking element that is attached to the outlet housing and that is able to protrude inwardly by a push pressure of the quick release locking sleeve for interlocking with the pipe connector. The outlet valve part has an outlet passage for insertion of the pipe connector. The outlet valve part is axially spaced from the inlet valve part by a gap and is axially movable to reduce a width of the gap.

The control mechanism includes an inner slide sleeve slidably disposed in the receiving space around the inlet valve part, an outer operating sleeve disposed around the housing unit, and at least one connection member that extends through the at least one through hole and that connects the inner slide sleeve and the outer operating sleeve such that the inner slide sleeve is movable relative to the inlet valve part when the outer operating sleeve is operated. The inner slide sleeve has a control chamber formed around the inlet valve part and communicating the at least one passage hole.

when the quick coupler assembly is in an original position, passage of fluid through the quick coupler assembly is blocked, and the quick release locking sleeve abuts the outer operating sleeve.

When the pipe connector is inserted into the outlet passage, the quick coupler assembly is transitioned to an initial pipe-connecting position, where passage of fluid is still blocked, the width of the gap between the inlet and outlet valve parts is reduced, and the quick release locking sleeve moves away from the outer operating sleeve along a first axial direction.

When the outer operating sleeve is operated to be moved along the first axial direction until the outer operating sleeve abuts the quick release locking sleeve, the quick coupler assembly is transitioned to a non-fluid blocking position, where passage of fluid is permitted, the inner slide sleeve spans the gap, and the control chamber connects the at least one passage hole of the inlet valve part to the gap and the outlet passage of the outlet valve part.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
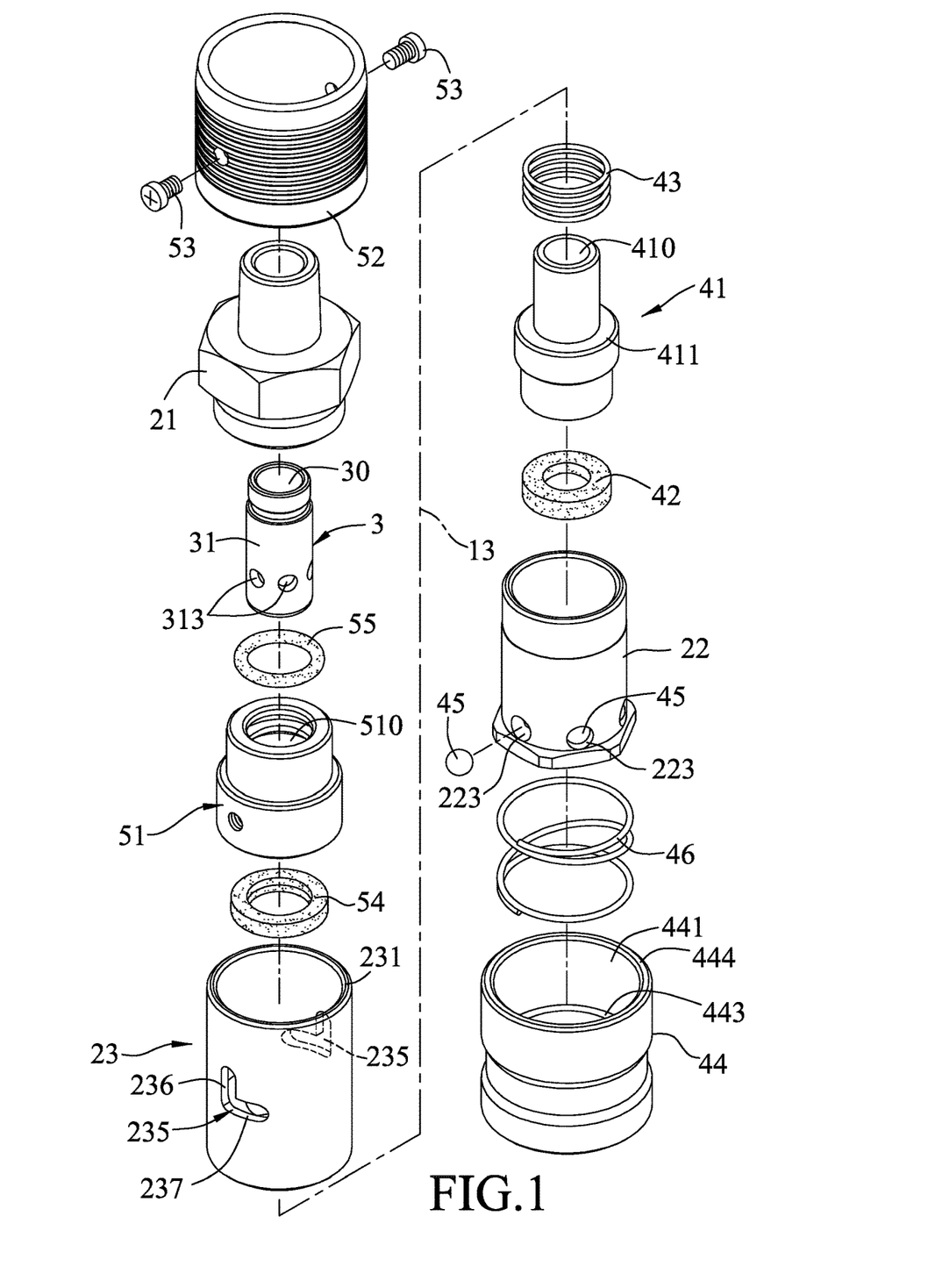
FIG. 1 is an exploded perspective view illustrating a quick coupler assembly according to an embodiment of the present disclosure.
Figure 2:
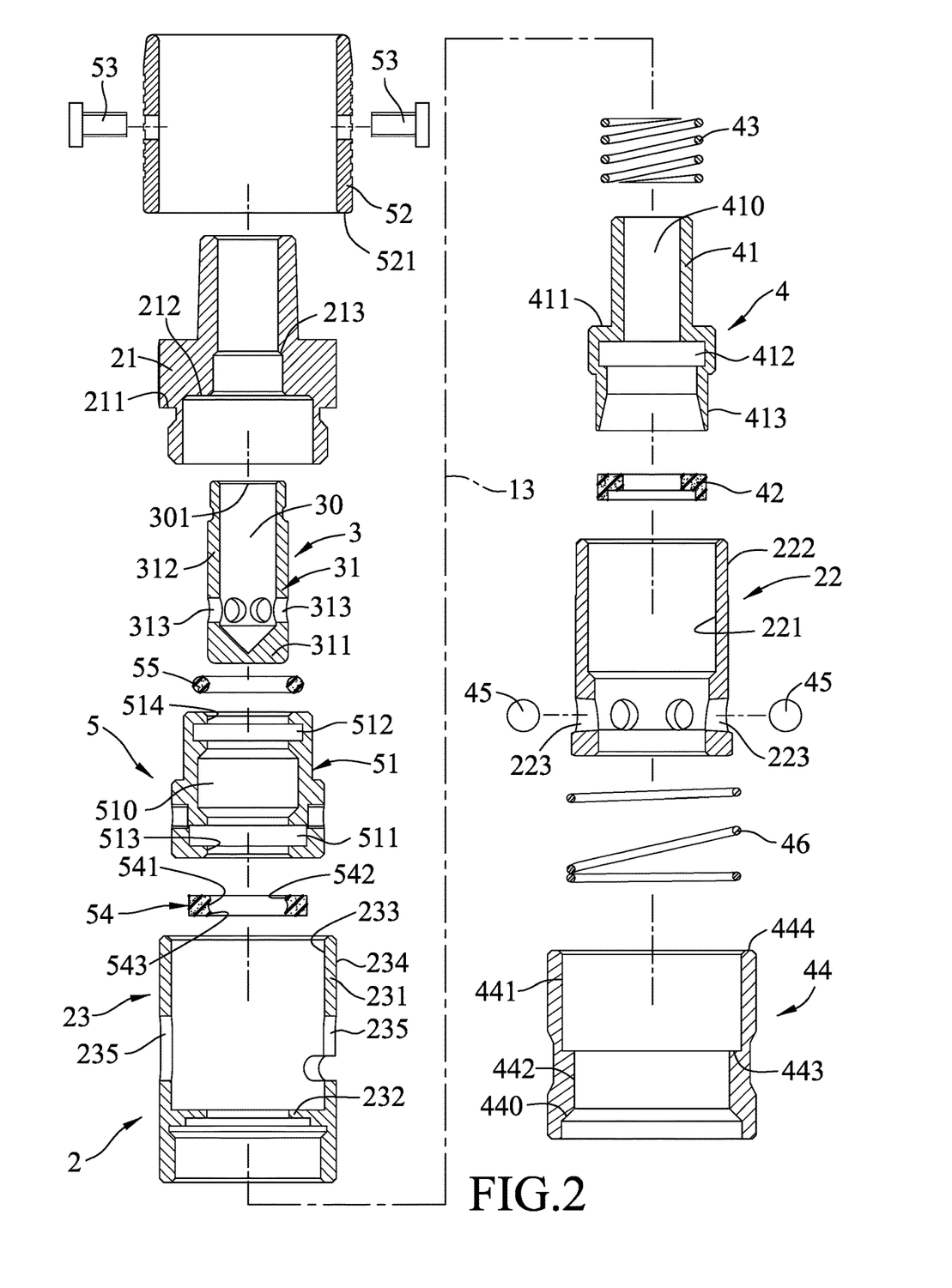
FIG. 2 is an exploded sectional view of the embodiment.
Figure 3:
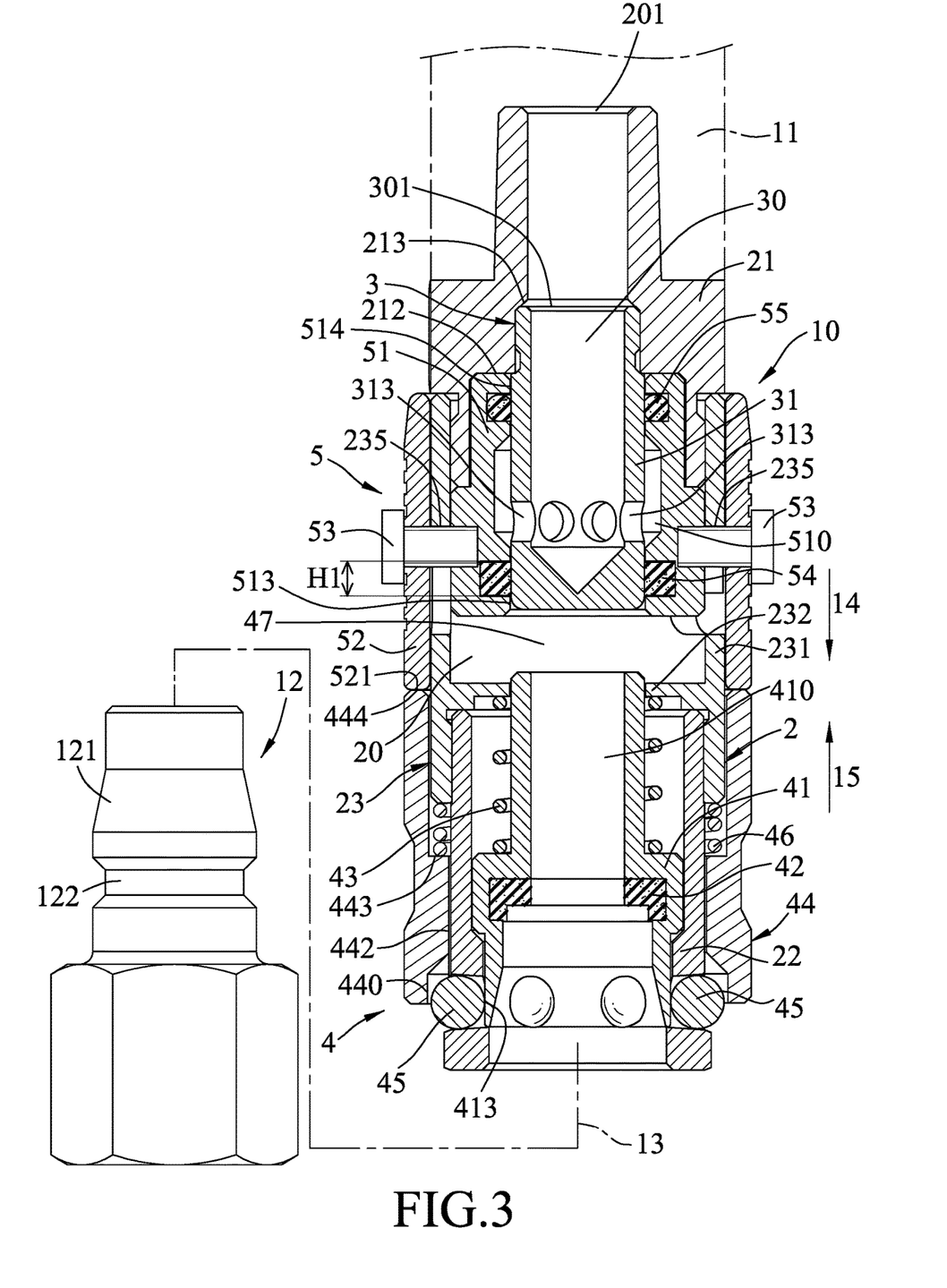
FIG. 3 illustrates the quick coupler assembly at an original position and a pipe connector.

FIGS. 1 to 3 illustrate a quick coupler assembly 10 according to an embodiment of the present disclosure. The quick coupler assembly 10 is mounted on a fluid supply device 11 for quick assembly/disassembly of a pipe connector 12 to the fluid supply device 11. The pipe connector 12 has an insertion portion 121 inserted into the quick coupler assembly 10, and an anchored portion 122 circumferentially and inwardly indented from the insertion portion 121. The quick coupler assembly 10 includes a housing unit 2, an inlet valve part 3, an outlet mechanism 4 and a control mechanism 5.

The housing unit 2 defines an axis 13 and includes an inlet housing part 21 connected to the fluid supply device 11, an outlet housing part 22 axially spaced apart from the inlet housing part 21, an intermediate housing part 23 connected between the inlet housing part 21 and the outlet housing part 22, and a receiving space 20 cooperatively defined by the inlet, outlet and intermediate housing parts 21, 22, 23. The receiving space 20 has an inlet opening 201 at an end of the inlet housing part 21.

The inlet housing part 21 has a first shoulder surface 211, a second shoulder surface 212, and a third shoulder surface 213.

The outlet housing part 22 has an inner surrounding surface 221 surrounding the axis 13, an outer surrounding surface 222 radially opposite to the inner surrounding surface 221, and a plurality of lock holes 223 extending through the inner and outer surrounding surfaces 221, 222.

The intermediate housing part 23 has a tube wall 231 surrounding the axis 13, and an annular inner flange 232 extending inwardly and radially from the tube wall 231. The tube wall 231 has an inner surface 233, an outer surface 234 opposite to the inner surface 233, and two through holes 235 each extending through the inner and outer surfaces 233, 234. Each through hole 235 has a positioning portion 237 extending along a circumferential direction of the tube wall 231, and an axially extending sliding portion 236 connecting one end of the positioning portion 237.

The inlet valve part 3 is installed inside the receiving space 20 and abuts the second and third shoulder surfaces 212, 213. In this embodiment, the inlet valve part 3 has a tubular valve wall 31 surrounding an inlet chamber 30 that has an inlet open end 301 for access of fluid. The tubular valve wall 31 has a bottom closed end portion 311, a tubular wall portion 312 extending circumferentially and upwardly from the bottom closed end portion 311 around the axis 13, and a plurality of passage holes 313 radially formed in the tubular wall portion 312 and communicating with the inlet chamber 30.

The outlet mechanism 4 includes an outlet valve part 41, a gasket 42, an outlet valve spring 43, a quick release locking sleeve 44, a plurality of locking elements 45 and a quick release spring 46. The outlet valve part 41 is movably installed inside the receiving space 20. Specifically, the outlet valve part 41 is movably disposed in the outlet housing part 22 and extends upwardly through the annular inner flange 232 of the intermediate housing part 23. The outlet valve part 41 is axially spaced from the inlet valve part 3 by a gap 47 and is axially movable to reduce a width of the gap 47.

The outlet valve part 41 has an outlet passage 410 for insertion of the pipe connector 12, an annular shoulder 411 spaced apart from the annular inner flange 232, an annular groove 412 formed in an inner surface surrounding the outlet passage 410, and a tubular push portion 413 disposed below the annular groove 412. The gasket 42 is received in the annular groove 412. The outlet valve spring 43 extends between and abuts the inner flange 232 of the intermediate housing part 23 and the annular shoulder 411. The gap 47 communicates the outlet passage 410 of the outlet valve part 41, but not communicates the inlet chamber 30 of the inlet valve part 3 in FIG. 3.

The quick release locking sleeve 44 is movably sleeved on the housing unit 2, specifically, on the outlet housing part 23. The quick release locking sleeve 44 has a first inner surrounding surface 441 surrounding the axis 13, a second inner surrounding surface 442 extending downwardly from the first inner surrounding surface 441, a spring abutment surface 443 formed at the junction of the first and second inner surrounding surfaces 441, 442, an expanding surface 440 radially outwardly expanding from the bottom of the second inner surface 442, and a looped first abutment end surface 444 radially and outwardly extending from a top end of the first inner surrounding surface 441.

The outlet housing part 22 is disposed between the outlet valve part 41 and the quick release locking sleeve 44. The inner surrounding surface 221 faces the outlet valve part 41. The outer surrounding surface 222 faces the quick release locking sleeve 44. The locking elements 45 are respectively disposed in the lock holes 233. The quick release spring 46 is disposed between a bottom end of the intermediate housing part 23 and the spring abutment surface 443 of the quick release locking sleeve 44 to urge the quick release locking sleeve 44.

The control mechanism 5 includes an inner slide sleeve 51, an outer operating sleeve 52, two connection members 53, a first seal ring 54 and a second seal ring 55. The inner slide sleeve 51 is slidably disposed in the receiving space 20 around the inlet valve part 3. The inner slide sleeve 51 has a first tubular slide surface 513 distal from the second shoulder surface 212 of inlet housing part 21 and slidably abutting an outer surface of the inlet valve part 3, a first groove 511 formed in the first tubular slide surface 513 and receiving the first seal ring 54, a second tubular slide surface 514 proximal to the second shoulder surface 212 of inlet housing part 21 and slidably abutting the outer surface of the inlet valve part 3, a second groove 512 formed in the second tubular slide surface 514 and receiving the second seal ring 55, and a control chamber 510 formed around the outer surface of the inlet valve part 3 between the first and second tubular slide surfaces 513, 514 and communicating the passage holes 313.

The outer operating sleeve 52 is disposed around and axially movable along the intermediate housing part 23 of the housing unit 2, and has a looped second abutment end surface 521 facing the looped first abutment end surface 444 of the quick release locking sleeve 44. The two connection members 53 respectively extend through the through holes 235 of the intermediate housing part 23 and connect the inner slide sleeve 51 and the outer operating sleeve 52 such that the inner slide sleeve 51 is movable relative to the inlet valve part 3 when the outer operating sleeve 52 is operated.

The first seal ring 54 and the second seal ring 55 are respectively disposed on two axially opposite sides of the control chamber 510 and the passage holes 313. The first seal ring 54 has a seal ring inner surface 541, a first sealing part 542 protruding inwardly from the seal ring inner surface 541, and a second sealing part 543 that protrudes inwardly from the seal ring inner surface 541 and that is axially spaced apart from the first sealing part 542. The first seal ring 54 has a thickness (H2) along the axis 13.

As shown in FIG. 3, when the quick coupler assembly 10 is at an original position, the outlet valve spring 43 urges the outlet valve part 41 to move in the first axial direction 14 such that the push tube portion 413 of the outlet valve part 41 pushes the locking elements 45 outward and toward the quick release locking sleeve 44. The locking elements 45 pushes upward the expanding surface 440 of the quick release locking sleeve 44 in a second axial direction 15 against the quick release spring 46. Accordingly, the looped first abutment end surface 444 of the quick release locking sleeve 44 abuts the looped second abutment end surface 521 of the outer operating sleeve 52 to prevent the outer operating sleeve 52 from moving in the first axial direction 14, thereby ensuring that the quick coupler assembly 10 is stably kept in the original position, where passage of fluid is blocked.

Figure 4:
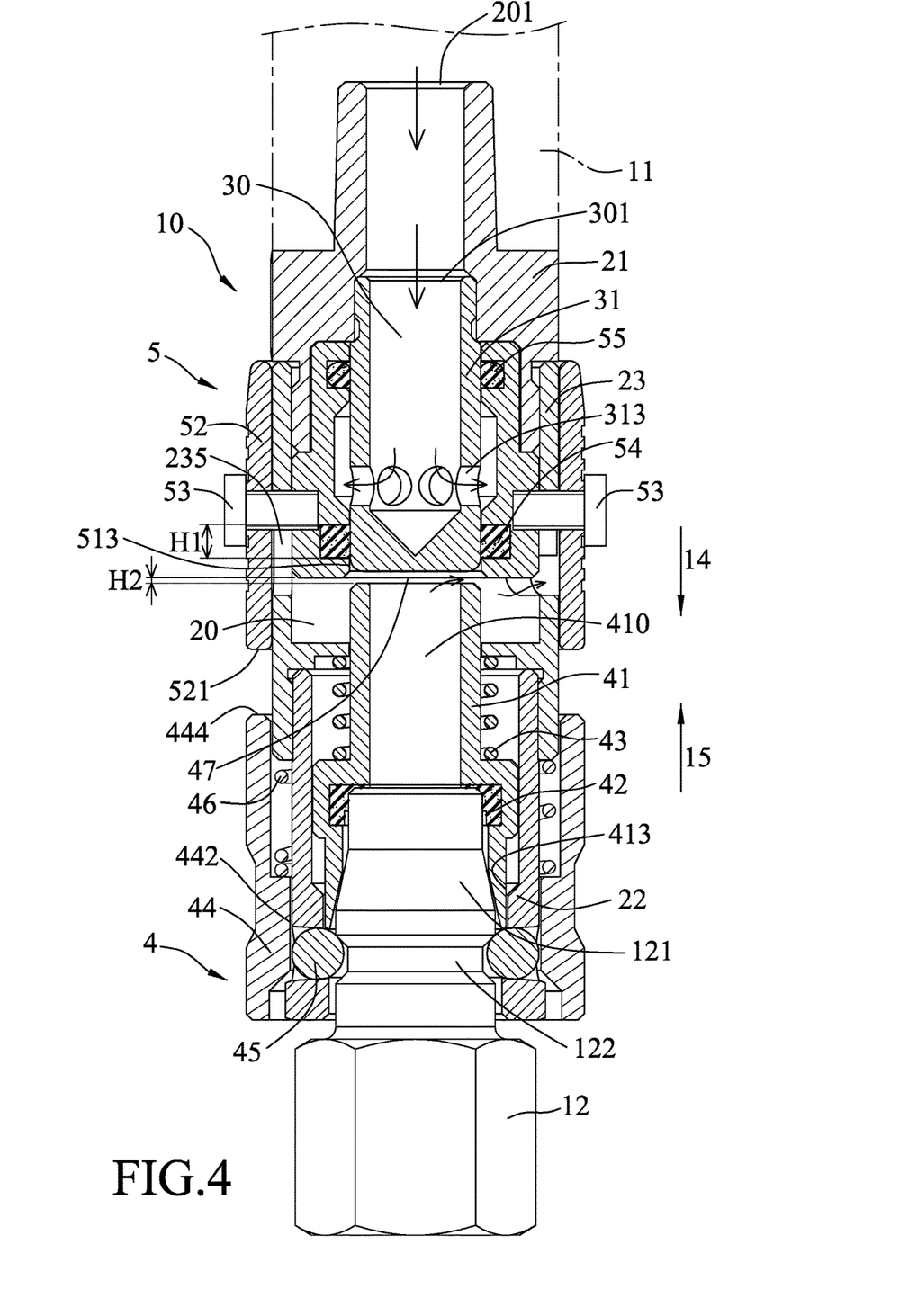
FIG. 4 illustrates the quick coupler assembly of the embodiment connecting the pipe connector at an initial pipe-connecting position.

Referring to FIG. 4, in combination with FIG. 3, when the pipe connector 12 is inserted into the outlet passage 410 of the outlet valve part 41 along the second axial direction 15, the quick coupler assembly 10 is transitioned to an initial pipe-connecting position, where the outlet valve part 41 is moved toward the inlet valve part 3 so that the width of the gap 47 between the inlet and outlet valve parts 3, 41 is reduced, and the quick release locking sleeve 44 moves away from the outer operating sleeve 52 along the first axial direction 14. During the transition, the gasket 42 and the outlet valve part 41 are pushed in the second axial direction 15, and the outlet valve spring 43 is compressed. When the push tube portion 413 of the outlet valve part 41 is higher than the locking elements 45, it does not push the locking elements 45. The quick release spring 46 urges the quick release locking sleeve 44 to move in the first axial direction 14 such that the second inner surface 442 of the quick release locking sleeve 44 pushes the locking elements 45 toward the anchored portion 122 of the pipe connector 12 inserted into the outlet passage 410. The locking elements 45 thus interlock with the pipe connector 12. Due to the action of the quick release spring 46, the looped first abutment end surface 444 of the quick release locking sleeve 44 is spaced apart from the looped second abutment end surface 521 of the outer operating sleeve 52. The thickness (H2) of the first seal ring 54 is greater than a width or height (H1) of the gap 47.

When the quick coupler assembly 10 is at the initial pipe-connecting positions, the fluid from the fluid supply device 11 is permitted to flow into the inlet chamber 30 of the inlet valve part 3 via the inlet opening 201, and to flow into the control chamber 510 of the inner slide sleeve 51 through the passage holes 313 of the inlet valve part 3. However, the first seal ring 54 blocks the fluid from flowing toward the outlet valve part 41 and the gap 47.

Figure 5:
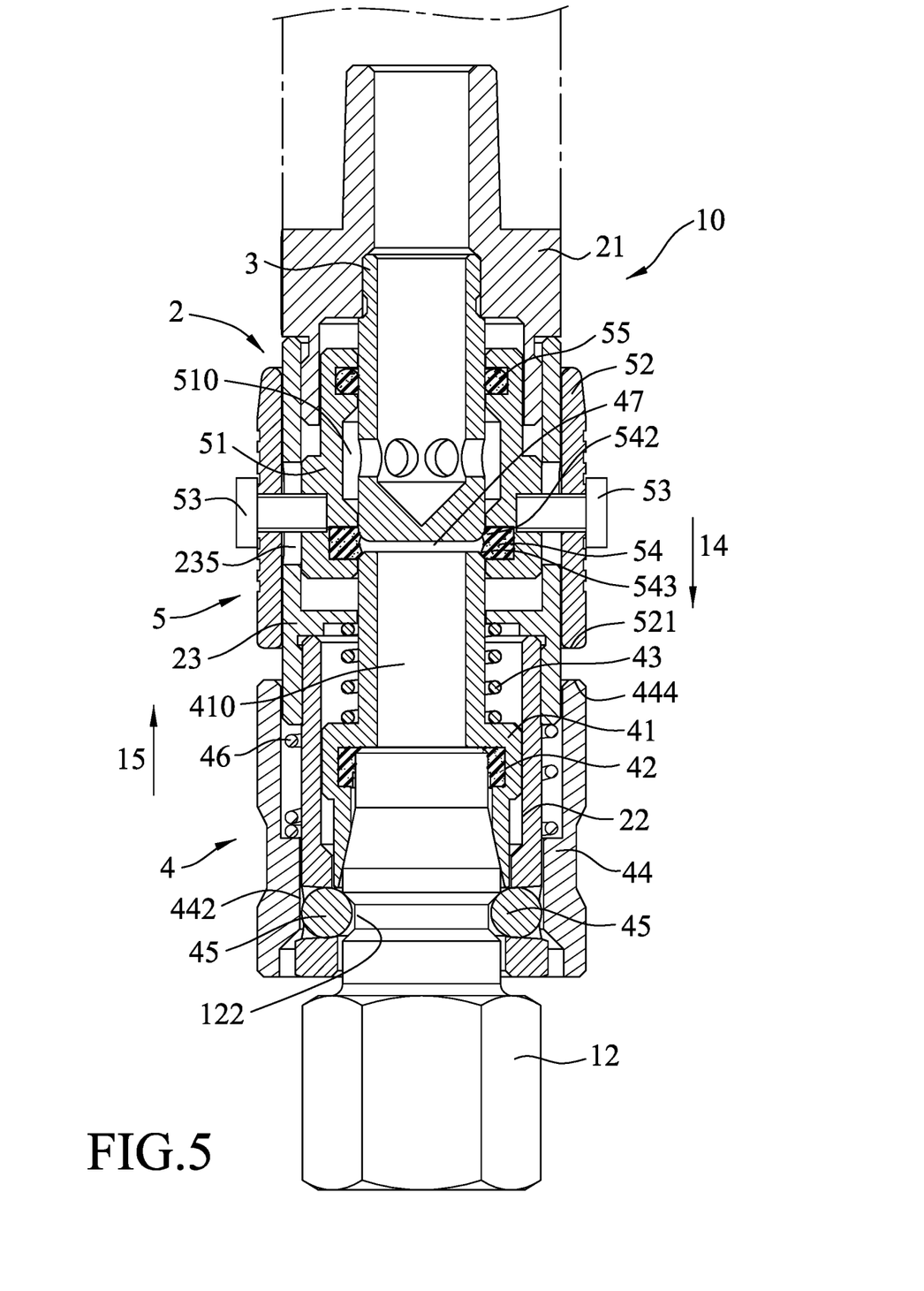
FIG. 5 illustrates the quick coupler assembly of the embodiment in a transitioning position before reaching a non-fluid blocking position.
Figure 6:
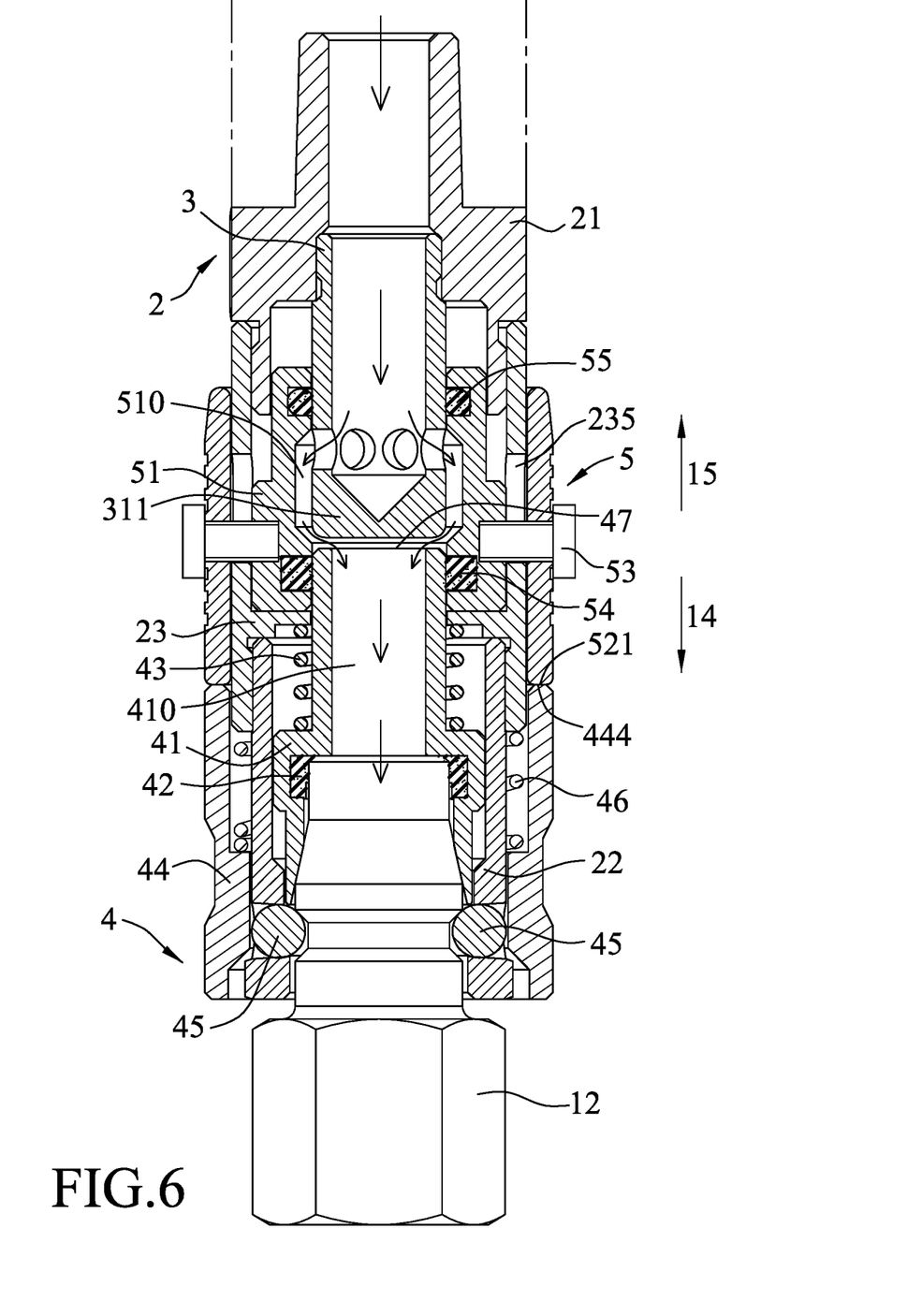
FIG. 6 illustrates the quick coupler assembly of the embodiment at the non-fluid blocking position.

Referring to FIGS. 5 and 6, in combination with FIGS. 1 and 4, when the quick coupler assembly 10 is required to be transitioned from the initial pipe-connecting position (see FIG. 4) to a non-fluid blocking position (see FIG. 6), the outer operating sleeve 52 is operated to be moved axially along the first axial direction 14 (see FIG. 5), and then to be turned circumferentially. Because the outer operating sleeve 52 is connected to the inner slide sleeve 51 by the two connection members 53 extending through the respective L-shaped through holes 235, the two connection members 53 are moved respectively along the axially extending sliding portions 236 of the through holes 235 in the first axial direction 14 to the positioning portions 237 during the transition of the quick coupler assembly 10 to the non-fluid blocking position from the initial pipe-connecting position. When the connection members 53 are positioned in the positioning portions 237 and the looped first abutment end surface 444 abuts the looped second abutment end surface 521, the quick coupler assembly 10 reaches the non-fluid blocking position (see FIG. 6).

During the transition to the non-fluid blocking position from the initial pipe-connecting position, the inner slide sleeve 51 is moved downward together with the first seal ring 54 to the outlet valve part 41 by the outer operating sleeve 52. When the second sealing part 543 of the first sealing ring 54 reaches the outlet valve part 41, the inner slide sleeve 51 span the gap 47. Because the thickness (H1) of the first seal ring 54 is greater than the height (H2) of the gap 47, the first sealing part 542 and the second sealing part 543 of the first seal ring 54 respectively abut the outer surfaces of the inlet valve part 3 and the outlet valve part 41 to seal the gap 47 and prevent leakage (see FIG. 5). When the first sealing part 542 is below the bottom closed end portion 311 of the inlet valve part 3 and the gap 47, the first and second seal rings 54, 55 respectively abuts the outer surfaces of the inlet and outlet valve parts 3, 41 (see FIG. 6). The fluid accumulated in the control chamber 510 flows through the gap 47 and into the outlet passage 410 and the pipe connector 12. In this state, the first tubular slide surface 513 is away from the outer surface of the inlet valve part 3 to provide a passageway that is formed between the first tubular slide surface 513 and the inlet valve part 3 for fluid to flow from the control chamber 510 to the gap 47 and the outlet passage 410 of the outlet valve part 41.

Since the looped second abutment end surface 521 of the outer operating sleeve 52 moving in the first axial direction 14 abuts the looped first abutment end surface 444 of the quick release locking sleeve 44, the outer operating sleeve 52 prevents the quick release locking sleeve 44 from moving in the second axial direction 15. The quick release locking sleeve 44 is thus immobilized when the non-fluid blocking position is reached. As such, disassembly or escape of the pipe connector 12 from the quick coupler assembly 10 is restricted when fluid flows through the quick release coupler assembly.

To remove the pipe connector 12 from the quick coupler assembly 10, the outer operating sleeve 52 is first operated to rotate by an angle and to thereafter slide axially along the second axial direction 15 opposite to the first axial direction 14. The quick coupler assembly 10 thus returns to the initial pipe-connecting position from the non-fluid blocking position. Because the inner slide sleeve 51 is moved away from the outlet valve part 41 and the gap 47, the gap 47 is not sealed, and fluid remaining in the gap 47 and the outlet passage 410 is able to escape from the housing unit 2 through the through holes 235 of the intermediate housing part 23. Because the outer operating sleeve 52 is moved in the second axial direction 15 away from the quick release locking sleeve 44, the quick release locking sleeve 44 is able to be moved in the second axial direction 15 for removal of the pipe connector 12.

Moreover, when the quick coupler assembly 10 is transitioned from the non-fluid blocking position (see FIG. 6) to the initial pipe-connecting position (see the FIG. 4), because fluid in the gap 47 and the outlet passage 410 is able to escape from the housing unit 2 through the through holes 235 of the intermediate housing part 23, extreme high pressure is not generated inside the housing init 2. Therefore, when the pipe connector 12 is removed, the pipe connector 12 will not spurt outwardly from the quick coupler assembly 10.

To sum up, by virtue of the quick release locking sleeve 44 and the outer operating sleeve 52 which are arranged to abut against each other in the non-fluid blocking position, the pipe connector 12 can be assuredly prevented from being detached, or escaping from the quick coupler assembly 10 during passage of fluid. In addition, during removal of the pipe connector 12, because the fluid remaining in the gap 47 and the outlet passage 410 is able to escape from the housing unit 2 through the through holes 235 of the intermediate housing part 23, the pipe connector 12 will not spurt out by high fluid pressure. The quick coupler assembly 10 is therefore safe.

In the description above, for the purposes of explanation, numerous specific details have been set forth in order to provide a thorough understanding of the embodiments. It will be apparent, however, to one skilled in the art, that one or more other embodiments may be practiced without some of these specific details. It should be also appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

The invention claimed is:

1. A quick coupler assembly mountable on a fluid supply device for assembly with a pipe connector, comprising:
    a housing unit defining an axis and including an inlet housing part to be connected to the fluid supply device, an outlet housing part axially spaced apart from said inlet housing part, an intermediate housing part connected between said inlet housing part and said outlet housing part, and a receiving space cooperatively defined by said inlet, outlet and intermediate housing parts, said intermediate housing part having at least one through hole;
    an inlet valve part installed inside said receiving space, and having a tubular valve wall surrounding an inlet chamber that has an inlet open end, and at least one passage hole radially formed in said tubular valve wall and communicating with said inlet chamber;
    an outlet mechanism including an outlet valve part movably installed inside said receiving space, a quick release locking sleeve movably sleeved on said housing unit, and at least one locking element that is attached to said outlet housing and that is able to protrude inwardly by a push pressure of said quick release locking sleeve for interlocking with the pipe connector, said outlet valve part having an outlet passage for insertion of the pipe connector, said outlet valve part being axially spaced apart from said inlet valve part by a gap and is axially movable to reduce a width of the gap; and
    a control mechanism including an inner slide sleeve slidably disposed in said receiving space around said inlet valve part, an outer operating sleeve disposed around said housing unit, and at least one connection member that extends through said at least one through hole and that connects said inner slide sleeve and said outer operating sleeve such that said inner slide sleeve is movable relative to said inlet valve part when said outer operating sleeve is operated, said inner slide sleeve having a control chamber formed around said inlet valve part and communicating said at least one passage hole;
    wherein: when the quick coupler assembly is at an original position, passage of fluid through the quick coupler assembly is blocked, and said quick release locking sleeve abuts said outer operating sleeve;
    when the pipe connector is inserted into said outlet passage, the quick coupler assembly is transitioned to an initial pipe-connecting position, where passage of fluid is blocked, the width of said gap between said inlet and outlet valve parts is reduced, and said quick release locking sleeve moves away from said outer operating sleeve along a first axial direction;
    when said outer operating sleeve is operated to be moved along the first axial direction until said outer operating sleeve abuts said quick release locking sleeve, the quick coupler assembly is transitioned to a non-fluid blocking position, where passage of fluid is permitted, said inner slide sleeve spans said gap, and said control chamber connects said at least one passage hole of said inlet valve part to said gap and said outlet passage of said outlet valve part.

2. The quick coupler assembly as claimed in claim 1, wherein:
    said control mechanism further includes a first seal ring and a second seal ring that are respectively disposed on two axially opposite sides of said control chamber and said at least one passage hole; and
    when the quick coupler assembly is at the non-fluid blocking position, said first and second seal rings respectively abut an outer surface of said outlet valve part and an outer surface of said inlet valve part, and said gap is located between said first and second seal rings and communicates with said at least one passage hole through said control chamber.

3. The quick coupler assembly as claimed in claim 2, wherein:
    said first seal ring has a thickness greater than a height of said gap;
    said first seal ring has a seal ring inner surface, a first sealing part protruding inwardly from said seal ring inner surface, and a second sealing part that protrudes inwardly from said seal ring inner surface and that is axially spaced apart from said first sealing part; and
    when the quick coupler assembly is at the non-fluid blocking position, said first and second seal rings respectively abut said outer surfaces of said outlet valve part and said inlet valve part.

4. The quick coupler assembly (10) as claimed in claim 2, wherein:
    said first seal ring (54) has a thickness (H2) greater than a height (H1) of said gap (47);
    said first seal ring (54) has a seal ring inner surface (541), a first sealing part (542) protruding inwardly from said seal ring inner surface (541), and a second sealing part (543) that protrudes inwardly from said seal ring inner surface (541) and that is axially spaced apart from said first sealing part (542); and
    when said inner slide sleeve (51) is moved by said outer operating sleeve (52) for the transition of the quick coupler assembly (10) from the initial pipe-connecting position to the non-fluid blocking position, said first seal ring (54) is able to span said gap (47) such that said first and second sealing rings (54, 55) respectively abut said outer surfaces of said outlet valve part (41) and said inlet valve part.

5. The quick coupler assembly as claimed in claim 1, wherein:
    said intermediate housing has a tube wall, said tube wall having an inner surface, and an outer surface opposite to said inner surface, said at least one through hole including two through holes each extending through said inner and outer surfaces, each of said through holes having a positioning portion extending along a circumferential direction of said tube wall, and an axially extending sliding portion connecting said positioning portion;

said at least one connection member of said control mechanism includes two connection members that respectively extend through said through holes and that connect said inner slide sleeve and said outer operating sleeve, each of said connection members moving along said axially extending sliding portion during the transition of the quick coupler assembly to the non-fluid blocking position from said initial pipe-connecting position; and when the quick coupler assembly is at the non-fluid blocking position, said connection members are respectively positioned in said positioning portions of said through holes.

6. The quick coupler assembly as claimed in claim 5, wherein said outlet mechanism further includes a quick release spring disposed between said intermediate housing part and said quick release locking sleeve to urge said quick release locking sleeve.

7. The quick coupler assembly as claimed in claim 6, wherein said outlet housing part is disposed between said outlet valve part and said quick release locking sleeve, and has an inner surrounding surface facing said outlet valve part, an outer surrounding surface facing said quick release locking sleeve, and a plurality of lock holes extending through said inner and outer surrounding surfaces, said at least one locking element of said outlet mechanism including a plurality of locking elements that are respectively disposed in said lock holes, said outlet mechanism further including an outlet valve spring urging said outlet valve part to push said locking elements outwardly and toward said quick release locking sleeve.

8. The quick coupler assembly as claimed in claim 1, wherein said quick release locking sleeve has a looped first abutment end surface, said outer operating sleeve having a looped second abutment end surface, said looped first abutment end surface abutting said looped second abutment end surface when the quick coupler assembly is in one of the original and non-fluid blocking positions.

9. The quick coupler assembly as claimed in claim 7, wherein:
when the quick coupler assembly is at the original position, said outlet valve spring urges said outlet valve part to move in the first axial direction such that said outlet valve part pushes said locking elements toward said quick release locking sleeve, and said locking elements pushes said quick release locking sleeve in the second axial direction against said quick release spring;
when the quick coupler assembly is at one of the initial pipe-connecting and non-fluid blocking positions, said outlet valve part is pushed in a second axial direction against said outlet valve spring so that said outlet valve part does not push said locking elements, and said quick release spring urges said quick release locking sleeve to move in the first axial direction such that said quick release locking sleeve pushes said locking elements toward the pipe connector inserted into said outlet passage.

10. The quick coupler assembly as claimed in claim 9, wherein, when the quick coupler assembly is at the non-fluid blocking position, said quick release locking sleeve is in abutment with said outer operating sleeve, said outer operating sleeve prevents said quick release locking sleeve from moving in the second axial direction.

11. The quick coupler assembly as claimed in claim 2, wherein:
said inner slide sleeve has a first tubular slide surface proximal to said gap and slidably abutting said outer surface of said inlet valve part, a first groove formed in said first tubular slide surface and receiving said first seal ring, a second tubular slide surface distal from said gap and slidably abutting said outer surface of said inlet valve part, and a second groove formed in said second tubular slide surface and receiving said second seal ring, said control chamber being formed around said outer surface of said inlet valve part between said first and second tubular slide surfaces.

\* \* \* \* \*